United States Patent [19]

Sandgren

[11] Patent Number: 5,538,257
[45] Date of Patent: Jul. 23, 1996

[54] SPRING DEVICE AND METHOD FOR HOLDING A COMPONENT ON A SHAFT AND PUSHER SEAL ASSEMBLY USING SAME

[75] Inventor: Jan E. Sandgren, Cranston, R.I.

[73] Assignee: EG&G Sealol, Inc., Cranston, R.I.

[21] Appl. No.: 366,552

[22] Filed: Dec. 30, 1994

[51] Int. Cl.⁶ .................................................. F16J 15/34
[52] U.S. Cl. ........................ 277/1; 277/81 R; 277/81 S; 277/84; 277/85
[58] Field of Search .................... 277/8, 9, 38, 81 R, 277/81 S, 1, 39, 84, 85, 136, 192; 267/1.5; 464/77, 100, 101, 182

[56] References Cited

U.S. PATENT DOCUMENTS

| | | | |
|---|---|---|---|
| 1,439,845 | 12/1922 | Seib et al. | |
| 1,889,397 | 11/1932 | Baumheckel | 277/81 R |
| 1,899,785 | 2/1933 | Woodruff | 277/81 R |
| 2,245,475 | 6/1941 | Hatley | 277/38 |
| 2,701,155 | 2/1955 | Estel, Jr. | |
| 2,756,080 | 7/1956 | Andresen et al. | 277/81 R |
| 3,081,098 | 3/1963 | Srephens | 277/81 S |
| 3,559,725 | 2/1971 | Fucinari et al. | |
| 3,973,780 | 8/1976 | Hornschuch | |
| 5,039,113 | 8/1991 | Gardner | 277/81 R |
| 5,114,163 | 5/1992 | Radosav et al. | 277/81 S |
| 5,344,161 | 9/1994 | Sandgren | |
| 5,370,401 | 12/1994 | Sandgren | 277/81 S |
| 5,388,843 | 2/1995 | Sedy | 277/81 R |

FOREIGN PATENT DOCUMENTS

| | | | |
|---|---|---|---|
| 558067 | 9/1993 | European Pat. Off. | 277/81 R |
| 47059 | 4/1980 | Japan | 277/9 |
| 752266 | 7/1956 | United Kingdom | 277/81 R |
| 94020775 | 9/1994 | WIPO | 277/81 S |

*Primary Examiner*—Scott W. Cummings
*Attorney, Agent, or Firm*—Finnegan, Henderson, Farabow, Garrett & Dunner

[57] ABSTRACT

Split component to be held in a fixed position on a shaft includes a component member having at least two portions with opposite ends that mate together in sealing engagement, and a plurality of resilient holding segments positioned between the inner surface of the component member and the outer surface of the shaft for holding the component member in a fixed position on the shaft. By compression, the holding segments provide a resiliency-induced resistant force sufficient to prevent movement of the component member in an axial direction and in a circumferential direction relative to the shaft. In a preferred embodiment, each holding segment is a metal spring member extending less than 180° circumferentially around the outer surface of the shaft and having a continuous concave surface directed toward the outer surface of the shaft with gripping edges along opposite sides of the concave surface. A pusher seal assembly having a plurality of resilient holding segments to prevent axial and circumferential movement of a rotatable adaptor relative to a rotatable shaft, and a method for holding a split component in a fixed position on a shaft using a plurality of resilient holding segments, are also provided.

24 Claims, 8 Drawing Sheets

1

SPRING DEVICE AND METHOD FOR HOLDING A COMPONENT ON A SHAFT AND PUSHER SEAL ASSEMBLY USING SAME

BACKGROUND OF THE INVENTION

1. Field of the Invention

The present invention relates to a device and method for holding a component in a fixed position on a shaft. Particularly, the present invention is directed to a device and method for holding a split seal component on a rotatable shaft, and a pusher seal assembly including the same.

2. Description of Related Art

There are many situations in which a component of machinery must be mounted in a fixed position on a shaft. For example, a variety of machines include a rotating shaft that must be sealed around the shaft circumference to prevent the leakage of fluids. Typically, a seal assembly including two opposing sealing rings having corresponding sealing faces is used to seal the annular gap between the rotating shaft and the machinery housing. One sealing ring is referred to as the non-rotating sealing ring because it is mounted on a stationary structure adjacent the rotating shaft, while the other is referred to as the rotating sealing ring because it is secured to the rotating shaft so as to rotate with the shaft.

In a conventional seal assembly, each of the various seal components, including the non-rotating sealing ring and the rotating sealing ring, are generally fabricated as solid, single-piece members. Since the rotating sealing ring must be secured around the circumference of the shaft, mounting is performed by either disassembling the machinery or sliding the solid ring-shaped component along the length of the shaft. However, both methods considerably increase the time required for assembly, as well as the risk of damage to the machinery and the shaft. Once in position, the rotating sealing ring is typically mounted on the shaft using an adaptor, which is slid into position and then secured by set screws against movement in the axial and circumferential direction relative to the shaft.

Split seals have been developed so that each solid, single-piece component of the conventional seal assembly is replaced with a plurality of mating portions configured to surround the shaft when assembled. Specifically, each component of the split seal is formed by two halves, each subtending 180° around the periphery of the shaft. Each half has two opposite ends that mate with the ends of the corresponding half of the split component. Assembly and replacement of the seal components therefore can be accomplished without requiring disassembly of the machinery or relative movement along the length of the shaft. Rather, each split seal component is simply assembled around the shaft. In this manner, there are typical applications in which replacement of a solid seal assembly could take eight to twenty-four hours, while replacement of a split seal assembly might take one hour.

To minimize leakage across the split seal assembly, the rotating sealing ring and adaptor of the split seal should directly contact the shaft. Manufacturing limitations typically require, however, that a diametrical gap of at least about 0.002 to 0.005 inches be provided between the outer surface of the rotating shaft and the inner surface of the rotating sealing ring and adaptor. Therefore, these split seal components cannot be mounted in a fixed position on the shaft by simply mating the ends of the split adaptor halves together. This is because the diametrical gap precludes the transfer of sufficient resistant forces or torque to secure the rotating sealing ring or the adaptor to the shaft and against relative movement in the axial and circumferential directions. However, if the shaft diameter is made greater than that of the inner surface of the ring and adaptor, the ends of the adaptor halves will not butt together, allowing leakage therebetween.

One method that has been developed for mounting a split sealing ring adaptor to a shaft includes reducing the length of each half of the adaptor so that a gap of 0.005 to 0.02 inches between the ends of the adaptor halves is created. When the adaptor halves fare attached together, this gap allows the inside surface of the adaptor to be brought into engagement with the outer surface of the shaft. A separate sealing member, such as rubber or a similar elastomeric member, is used to seal the gap that is created between the ends of the adaptor halves. However, the risk and amount of leakage across the split seal assembly is generally increased when such elastomeric materials are used in this manner. Sealing in the axial direction is also accomplished by positioning elastomeric members, such as conventional O-rings between the adaptor and the shaft.

Another method that has been used is to secure the adaptor halves to the shaft, both axially and tangentially, with set screws. Each set screw extends radially inwardly through an adaptor half to contact the shaft. In such an arrangement, the inside diameter of the adaptor should be 0.002 to 0.005 in. greater than the outside diameter of the shaft. A disadvantage of this method is that the actual clamping force of the set screw on the shaft is dependent on the operator's strength. If too little force is used, the adaptor will slide on the shaft. If too much force is used, the halves may separate from each other to the extent that the elastomeric members between the halves, and between the halves and the shaft, can not properly fill the gaps between the two halves and between the halves and the shaft, thereby leading to leakage. Furthermore, the set screws may mar the shaft at the point of contact.

Therefore, there remains a need for a device and method for holding a component, particularly a split seal component, on a shaft in a fixed position.

With regard to the non-rotating sealing ring, a limited amount of axial movement is anticipated in split seal assemblies known as pusher seals. Specifically, the pusher seal assembly is configured to allow hydraulic pressure to urge the non-rotating sealing ring toward the rotating ring during operation. A spring is also provided to urge the rotating and non-rotating sealing rings into sealing engagement when operating pressure forces are not sufficient. Hence, the non-rotating sealing ring is retained against movement in the circumferential direction, yet allowed to move in the axial direction.

Assembly of the components of the split seal assembly may be difficult since a great deal of manipulation of components may be required. Further, the sealing rings are often split by cracking a solid sealing ring to form two or more portions having irregular mating surfaces. Although relatively fine grained material lacks the interlocking characteristic of a coarser material, coarser material is often more difficult to handle without damaging the radially extending mating surfaces.

SUMMARY OF THE INVENTION

The advantages and purpose of the present invention will be set forth in part in the description that follows, and in part will be obvious from the description, or may be learned by practice of the invention. The advantages and purpose of the invention will be realized and attained by means of the elements and combinations particularly pointed out in the appended claims.

To achieve the advantages set forth, and in accordance with the purpose of the invention, as embodied and broadly described herein, the present invention is directed to a split component to be mounted in a fixed position on an outer surface of a shaft. The split component includes a component member having an inner surface and at least two portions with opposite ends. The ends of the two portions mate together to assemble the component member peripherally around the outer surface of the shaft. The split component further includes a plurality of resilient holding segments positioned between the inner surface of the component member and the outer surface of the shaft so that compression of the holding segments provides a resiliency-induced resistant force sufficient to prevent movement of the component member in an axial direction and in a circumferential direction relative to the shaft. In a preferred embodiment, each of the holding segments is a metal spring member that extends less than 180° circumferentially around the outer surface of the shaft, and has a continuous concave surface directed toward the outer surface of the shaft with gripping edges along opposite sides of the concave surface.

Additional aspects of the present invention include employing the resilient holding segments in a pusher seal assembly to prevent axial and circumferential movement of a rotatable adaptor relative to a rotatable shaft; and a method of mounting a split component in a fixed position on a shaft using a plurality of resilient holding segments.

It is to be understood that both the foregoing general description and the following detailed description are exemplary and explanatory only and are not restrictive to the invention, as claimed.

The accompanying drawings, which are incorporated in and constitute a part of the specification, illustrate embodiments of the invention and together with the description, serve to explain the principles of the invention.

DESCRIPTION OF THE PREFERRED EMBODIMENTS

Figure 1:
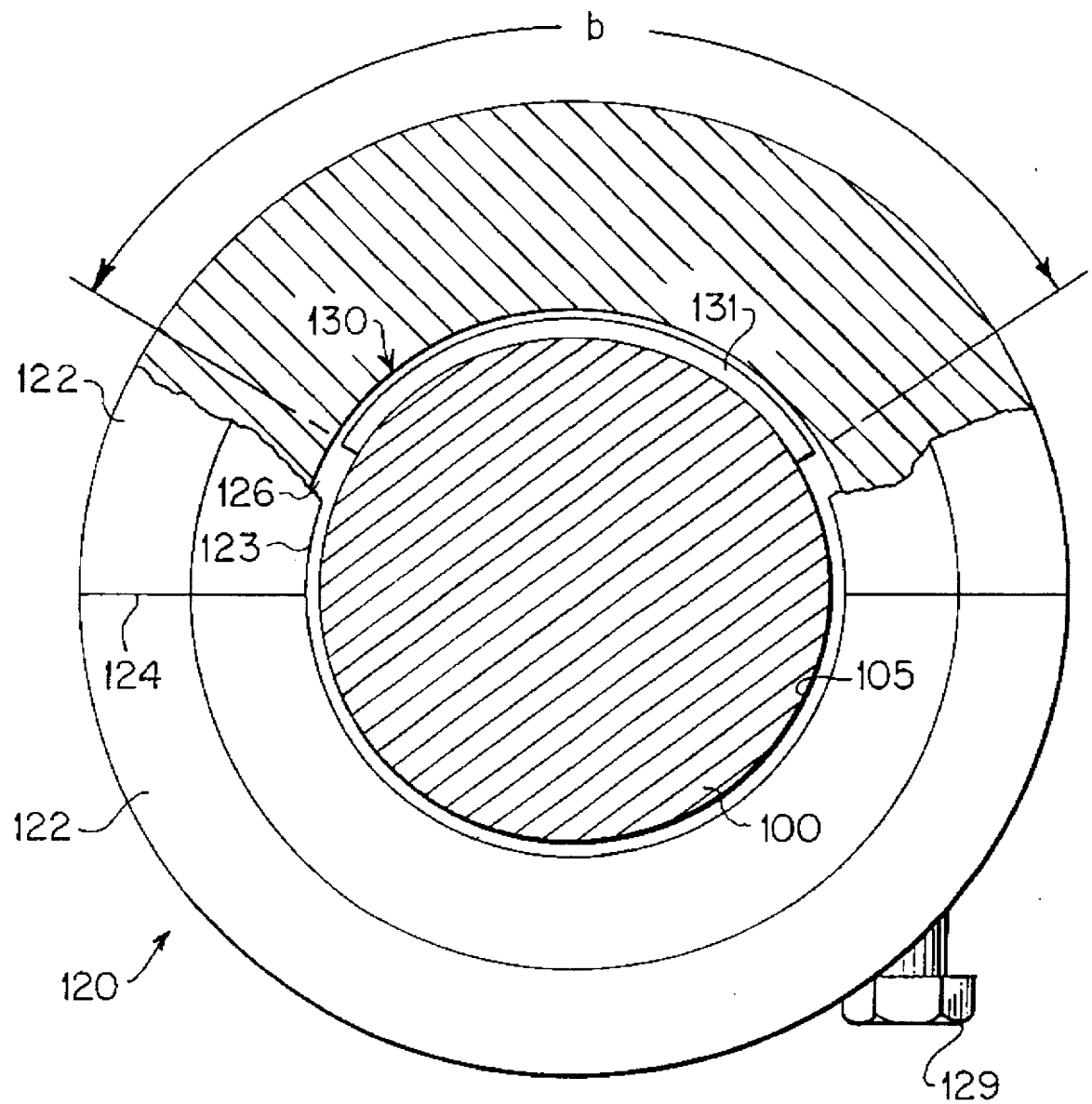
FIG. 1 is a partially fragmented front view of an exemplary split component held in a fixed position on a shaft by resilient holding segments in accordance with the present invention.

FIG. 1 shows an exemplary component member 120 that includes at least two portions 122 having opposite ends 124, and an inner surface 123. The ends 124 of the component member 120 mate together to assemble the component member 120 peripherally around the outer surface 105 of the shaft 100. To ensure that the ends 124 of the portions 122 are properly aligned with each other, alignment pins (not shown) and apertures may be used. Alternatively, the portions 122 of the component member 120 may be formed by breaking a single-piece structure so as to form irregular mating surfaces at either end of the separate portions 122. When properly aligned and positioned on the shaft 100, and as shown in FIG. 1, the inner surface 123 of the component member 120 is directed toward the outer surface 105 of the shaft 100. Screws 129 or the like are then used to attach the portions 122 together.

In accordance with the present invention, a device and method are provided for holding a component in a fixed position on the outer surface of a shaft. The steps of the method will be described in conjunction with and by reference to the operation of the device.

Figure 2:
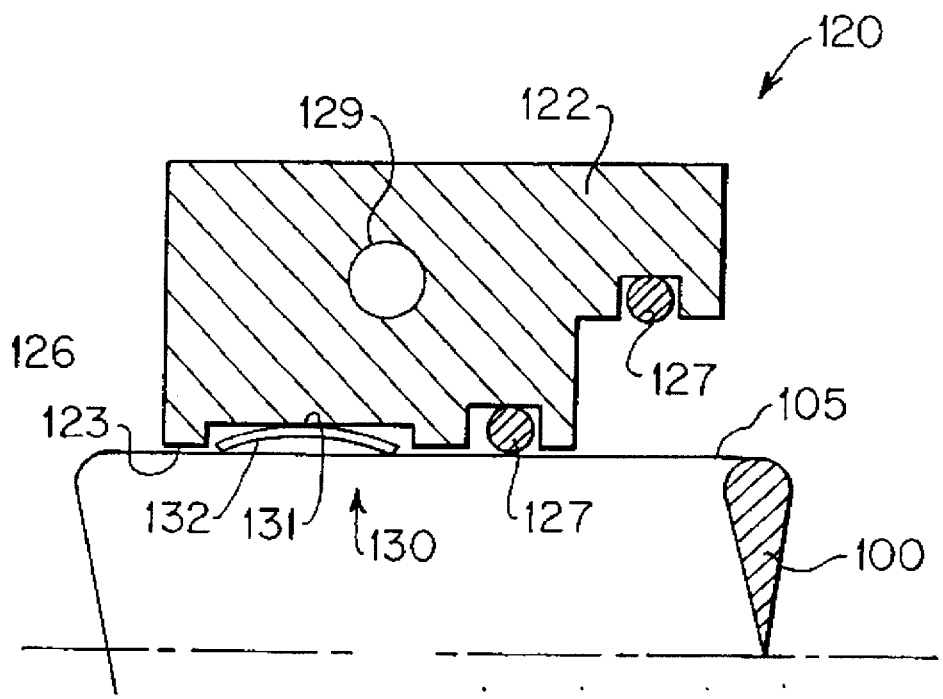
FIG. 2 is a cross-sectional view of the split component of FIG. 1.
Figure 3:
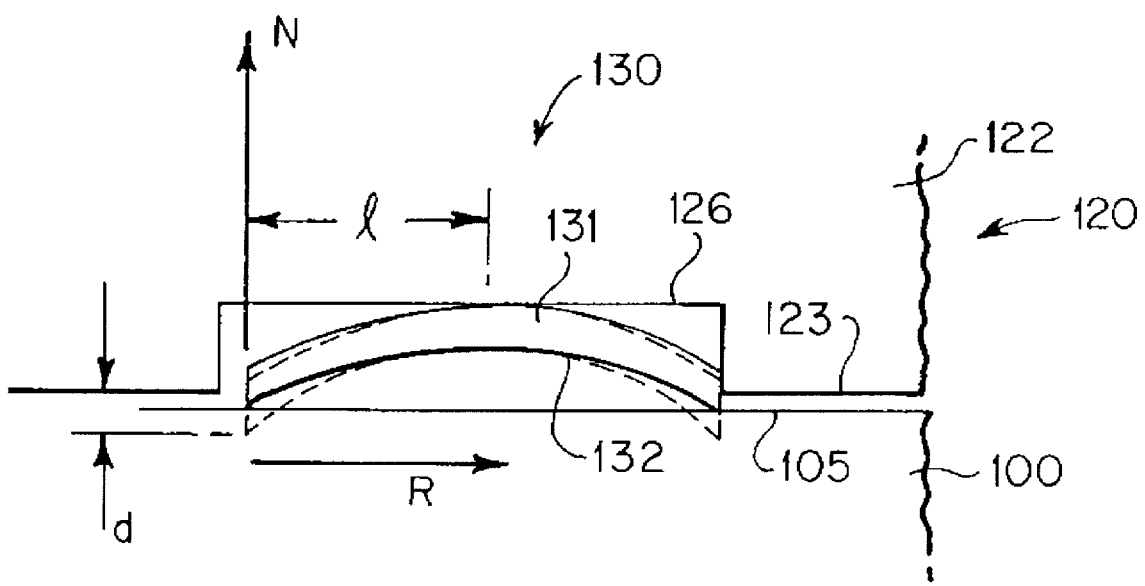
FIG. 3 is an enlarged schematic view of the resilient holding segment of FIG. 2.

For purposes of example and illustration, the device of the present invention is employed to hold the exemplary component member 120 of FIGS. 1 through 3 in a fixed position on the shaft 100. The preferred embodiment of the device includes a plurality of resilient holding segments 130 positioned between the inner surface 123 of the component member 120 and the outer surface 105 of the shaft 100. Compression of the holding segments 130 provides a resiliency-induced resistant force sufficient to prevent movement of the component member 120 in an axial direction along the shaft 100. Additionally, when the component member 120 is mounted on a shaft 100 having a circular cross section, as shown in FIGS. 1 through 3, the resistant force that is provided by compression of the holding segments 130 is sufficient to prevent movement of the component member 120 in a circumferential direction relative to the shaft 100. The device and method of the present invention likewise may be used, however, for holding a component member on a shaft having an alternate cross section, such as an elliptical or polygonal shape, wherein the inner surface of the component member is configured accordingly.

In the preferred embodiment of the present invention, and as seen in FIGS. 2 and 3, each holding segment 130 is a spring member 131 having a continuous concave surface 132 directed toward the outer surface 105 of the shaft 100. Particularly, the holding segment 130 has a generally uniform thickness and an arcuate cross-section along its entire length. Although it is preferred that the spring member 131 is made of metal, similar durable materials also may be used, such as carbon or graphite composites. Alternatively, the holding segments 130 may include strips of sufficiently resiliently material or the like.

The resiliency that is required of the holding segments 130 to hold the component member in place is at least partially a function of the expected operating environment and conditions of the component member. With reference to the holding segment 130 shown in FIG. 3, the principles of operation and the determination of the required resiliency are explained in further detail. The illustration of FIG. 3 is not to scale, however, and is not intended to demonstrate the actual degree of deflection or compression that is expected.

Regarding the principles of operation, a radially-directed resultant force is applied by each holding segment 130, when compressed, between the component member 120 and the shaft 100. This resultant force is schematically represented by arrow N in FIG. 3 for purpose of illustration. The magnitude of the resultant force is determined, at least in part, by the resiliency of the holding segment 130 and the extent in which the holding segment 130 is compressed. Generally, the greater the extent of compression, the greater the resultant force that is applied.

A resistant force, which is generally equivalent to the product of the resultant force and the friction coefficient between the holding segment 130 and the shaft 100, is likewise developed by each holding segment 130. The resistant force is directed in the axial direction, as schematically presented in FIG. 3 by arrow R, as well as the circumferential direction (not shown) of the shaft 100. Hence, and in accordance with the present invention, compression of the holding segments provides a resiliency-induced resistant force sufficient to prevent relative movement of the component member.

The resiliency of the holding segments 130 must be properly established so as to provide a resistant force sufficient to hold the component member 120 in place. This is accomplished by first identifying the maximum forces and torque that are expected to operate on the component member 120. Once identified, the resistant force required to prevent axial and circumferential movement of the component member 130 is then determined. By adjusting for the friction coefficient between the holding segments 130 and the shaft 100, the required radially-directed resultant force of each holding segment 120 is then calculated.

Since the resultant force applied by each resilient holding segment 130 is a function of deflection, the required resiliency can be determined based upon the amount of deflection or compression that is desired or expected. In this manner, the holding segments 130 are configured or selected so that resiliency is established to provide sufficient resistant force against relative movement of the component member 120. Therefore, the configuration, dimensions, and material of construction of the holding segments 130 will depend upon the resiliency required to satisfy the intended application.

Preferably, the holding segments 130 are sized and configured so as to be sufficiently compressed simply by attaching the separate portions 122 of the component member 120 together about the shaft 100. In this manner, no additional adjustment or compression of the holding segments 130 is required to hold the component member 120 in a fixed position. It is also preferred that the holding segments 130 are sufficiently resilient, however, to ensure that the ends 124 of the portions 122 mate in sealing engagement so an undesirable gap between the ends 124 is not created.

The force that compresses the holding segments 130 in the preferred embodiment, and thus, the resultant force that is applied by the holding segments 130 between the component member 120 and the shaft 100, is therefore provided by the force that is required to mate the ends 124 into sealing engagement. For example, and with reference to the embodiment of FIGS. 1 through 3, this force is provided by screws 129 (only one shown for clarity) that attach the portions 122 together with the ends 124 mated in sealing engagement.

As embodied herein, and as seen in FIGS. 1 through 3, the component member 120 is provided with at least one recess 126 on the inner surface 123 of each portion 122 for receiving the holding segments 130. Depending upon the number of holding segments 130 to be used, a separate recess 126 may be provided for each holding segment 130 or a single recess 126 may be provided to receive a plurality of holding segments 130. Accordingly, the recess 126 may have a length that corresponds to the length of one holding segment 130, or may have a length sufficient to receive a plurality of holding members. The preferred embodiment presented herein includes one holding segment 130 for each portion 122.

The recess 126 simplifies positioning of the holding segments 130 by properly locating the holding segments 130 prior to assembly and maintaining the locations of the holding segments 130 after assembly, as will be described. The recess 126 also enables direct sealing engagement between the inner surface 123 of the component member 120 and the outer surface 105 of the shaft 100. To accommodate manufacturing tolerances, direct sealing engagement is accomplished when the inner surface 123 of the component member 120 is spaced from the outer surface 105 of the shaft 100 by a distance no greater than about 0.005 inches.

The holding segments 130 are configured such that each holding segment 130 extends beyond the corresponding recess 126 toward the shaft 100, as best seen in FIG. 3. This allows for compression of the holding segments 130 when the component member 120 is assembled around the shaft 100. To ensure proper operation, the holding segments 130 have a resiliency sufficient to maintain the extension of the holding segments 130 beyond the recess 126, even when sufficiently compressed to hold the component member 120 in place. For direct sealing engagement, however, the holding segments 130 should not extend much more than about 0.005 inches beyond the recess when sufficiently compressed.

Specifically, and with reference to FIG. 3 for purpose of explanation, the holding segment 130 extends from the recess 126 by a distance d when uncompressed. Therefore, the resiliency of each holding segment 130 is established so the deflection δ of the holding segment 130 does not exceed the distance d when compressed. This deflection may be generally determined by the equation:

$$\delta = (P.l^3)/(3.EI) \tag{1}$$

where P is the compressive force that is applied to the holding segment, l is ½ the width of the holding segment as shown in FIG. 3, E is the modulus of elasticity of the holding segment, and I is the moment of inertia of the holding segment. The moment of inertia may be established by $I=(b.h^3)/12$, where b is the overall length of the holding segment, as seen in FIG. 1, and h is the thickness of the holding segment. If a holding segment having an alternate cross-section is used, then the equation (1) will be altered accordingly.

To avoid failure of the holding segments 130, the resiliency is likewise established so the yield stress $\sigma_y$ of each holding segment 130 is not exceeded when the holding segments 130 are compressed sufficiently to hold the rotatable seal member in place. Hence, for the holding segment 130 of FIG. 3, $$\sigma_y > 6 \ (P.l)/(b.h^2) \tag{2}$$

where P is the compressive force that is applied to the holding segment, l is ½ the width of the holding segment as shown in FIG. 3, b is the overall length of the holding segment, as seen in FIG. 1, and h is the thickness of the holding segment.

FIG. 1 shows that each holding segment 130 embodied herein extends less than 180° circumferential around the outer surface 105 of the shaft 100, wherein a range between about 120° and 160° is preferred. By limiting the length of each holding segment 130 in this manner, assembly of the component member 120 on the shaft 100 is further simplified. For example, if each holding segment 130 is limited to a length less than that of the portion 122 of the component member 120, positioning of the holding segments 130 is accomplished simply by inserting each holding segment 130 into the corresponding recess 126 that is provided on the inner surface 123 of each portion 122 prior to assembly. This eliminates awkward handling and assembly of separate parts around the circumference of the shaft 100. Additionally, damage to the separate parts is minimized since the holding segments 130 and component member 120 need not be slid into proper position.

Limiting the length of each holding segment 130 also establishes the resiliency of each holding segment 130, so as to prevent an excessive resultant force from being applied between the shaft 100 and the sealing component. That is, the resiliency of the holding segment 130 is at least partially a function of its length, as evident from equations (1) and (2) above. If the holding segments 130 are not sufficiently resilient, the resultant force applied by the holding segments 130 may exceed the force required to join the ends 124 of the portions 122 in sealing engagement, as applied by the screws 129. Hence, a gap would be created between the ends 124 of the portions 122 as the clamping screws 129 are tightened to attach the portions 122 together. Therefore, by limiting the length of each holding segment 130, and thus, the amount in which each holding segment 130 extends circumferentially around the outer surface 105 of the shaft 100, the required resiliency of the holding members is established.

To further prevent movement relative to the shaft 100, the spring member 131 has gripping edges 134 directed toward the outer surface 105 of the shaft 100 along opposite sides of the concave surface 132. The gripping edges 134 may be relatively sharp edges that extend along a substantial length of the spring member 131, or the gripping edges 134 may be segmented or serrated edges. The gripping edges 134 enhance the operation of the holding segment 130 in at least two manners. First, the gripping edges 134 dig into the outer surface 105 of the shaft 100 to further prevent movement of the component member 120 relative to the shaft 100. When axial movement of the component member 120 is attempted, the gripping edges 134 cause the spring member 131 to distort such that the resultant force that is applied between the component member 120 and the shaft 100, and thus, the resistant force that is provided to prevent relative movement of the component, are increased. Alternate configurations of the holding segments 130 likewise may be used to increase the resistant force provided when movement of the component member relative to the shaft is attempted.

The device and method of the present invention are not limited to the resilient holding segments shown in FIGS. 1–3. Rather, alternate embodiments of resilient holding segments may also be used, so long as compression of the holding segments provides a resiliency-induced resistant force sufficient to prevent movement of a component member along a shaft in an axial direction, as well as in a circumferential direction, if necessary.

The present invention is further clarified by the following example of a pusher seal assembly employing the device and method in accordance with the invention. The pusher seal assembly is used for sealing an annular gap between a housing (not shown) and an outer surface of a rotatable shaft 100. Many combinations of dimensions or materials may be used in the design of the pusher seal assembly and the corresponding holding segments of the device, in accordance with the teachings provided herein. However, the configuration, dimensions, and material of construction of the holding segments will depend upon the resiliency required to satisfy the intended application, as described above.

Figure 4:
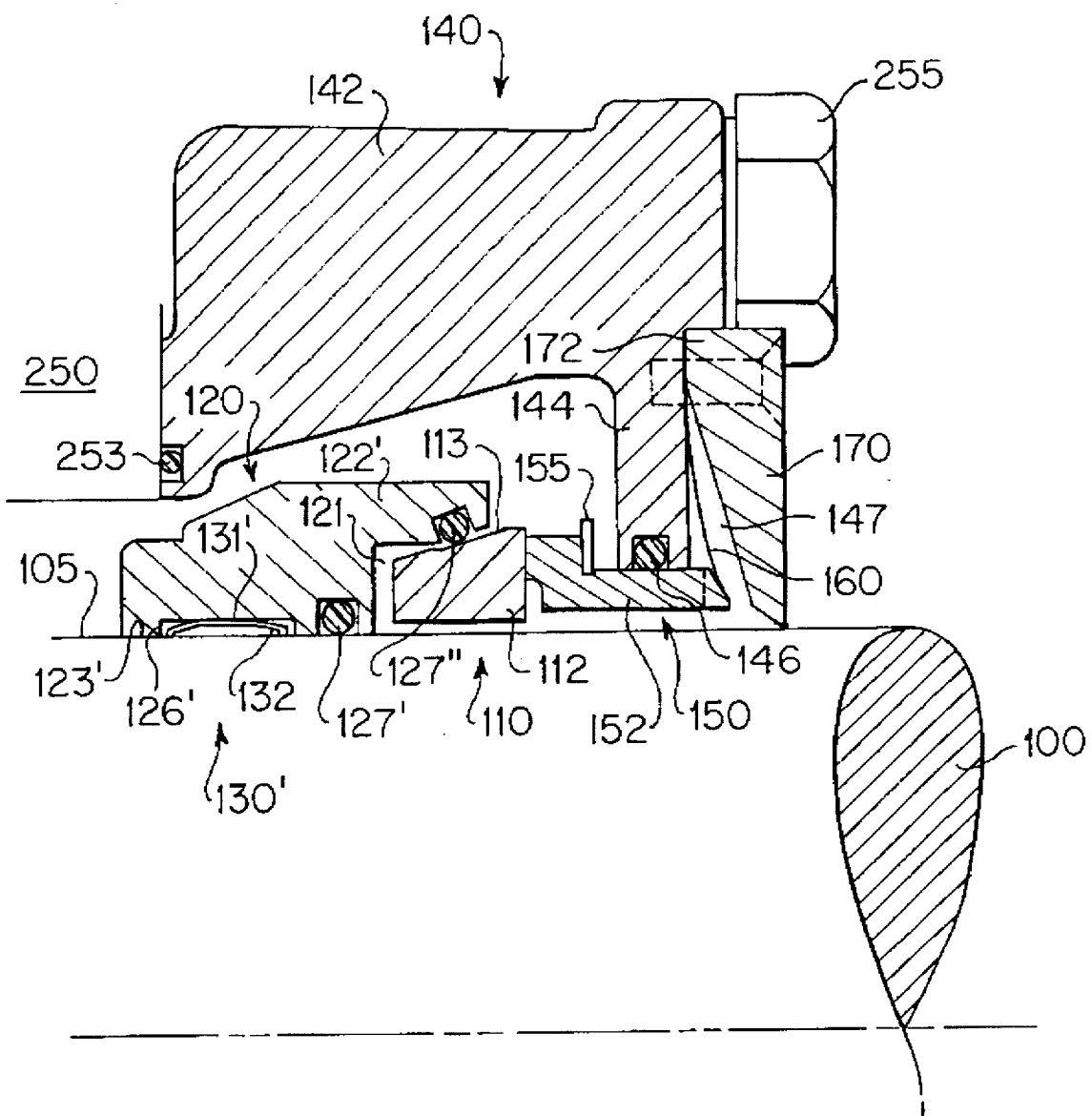
FIG. 4 is a partial cross-sectional view of a pusher seal assembly having resilient holding segments in accordance with the present invention.
Figure 5:
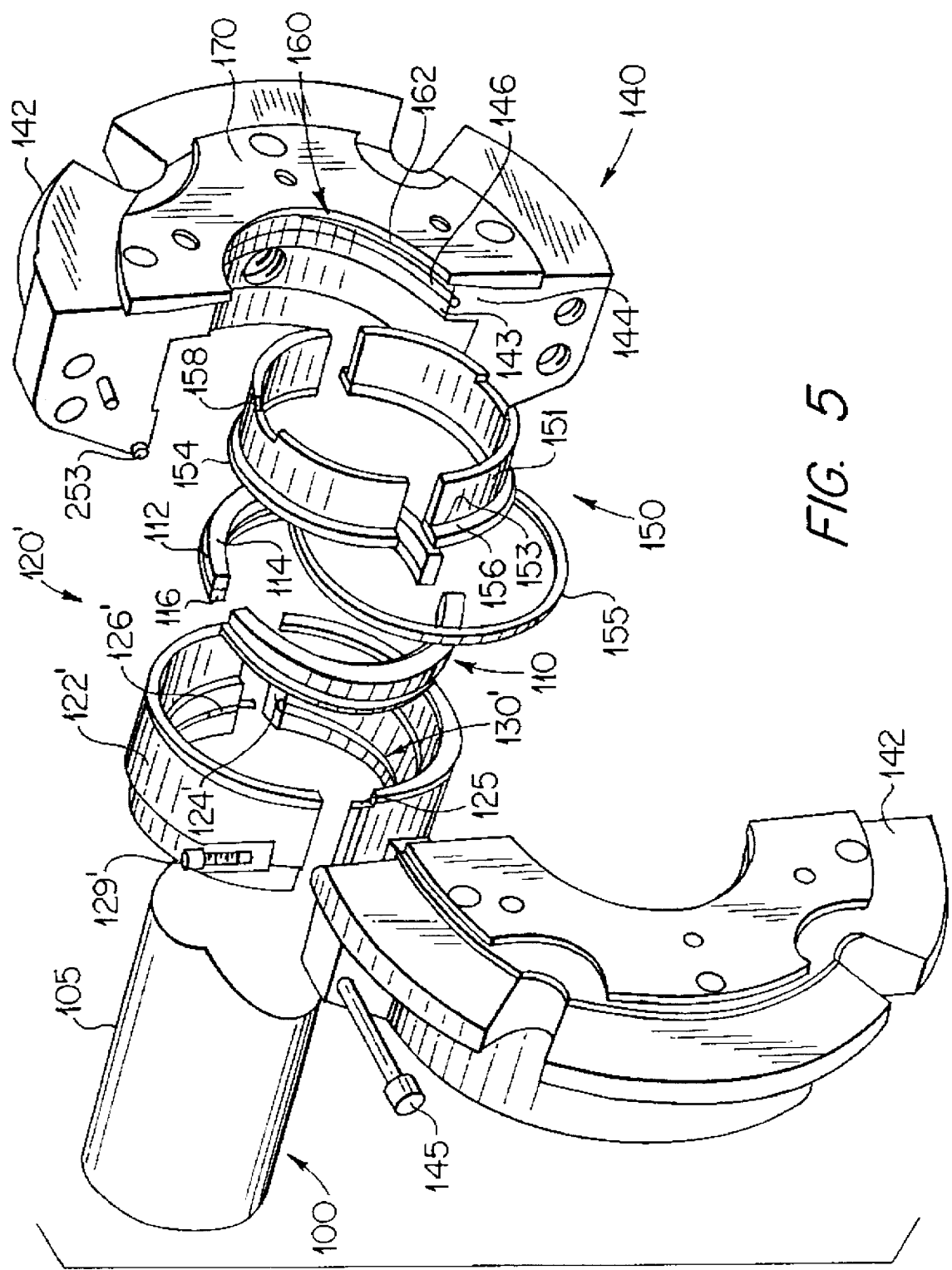
FIG. 5 is an exploded, axonometric view of the pusher seal assembly of FIG. 4.

As shown in FIGS. 4 and 5, the exemplary pusher seal assembly includes a rotatable seal member 110 and a rotatable adaptor 120'. The rotatable adaptor 120' is mounted circumferentially around the outer surface 105 of the rotatable shaft 100, while the rotatable seal member 110 is securely received within a chamber 121 provided along an inner diameter surface 123' of the rotatable adaptor 120'.

Figure 6:
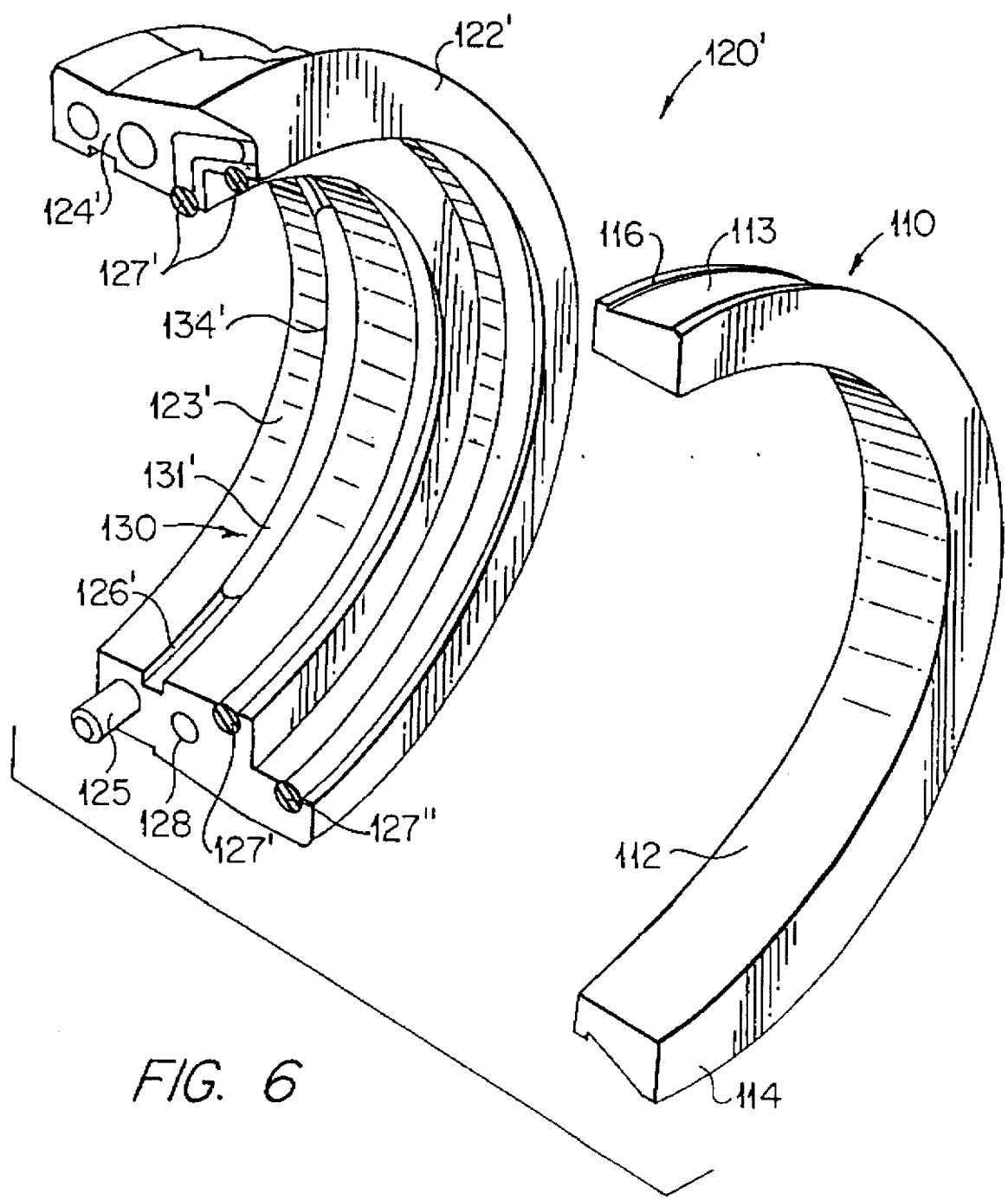
FIG. 6 is an exploded, axonometric view of a portion of the rotatable seal member and the rotatable adaptor.

The rotatable seal member 110 and the rotatable adaptor 120' embodied herein are each split into at least two portions having opposite ends for simplified assembly around the rotatable shaft 100. The ends of the portions 112 of the rotatable seal member 110 may be provided with irregular mating surfaces by breaking a solid, ring-shaped member, while the portions 122' of the rotatable adaptor 120' include alignment pins 125 that are received by corresponding alignment apertures 128 during assembly. Additionally, packing O-rings 127' and 127" are located on an inner surface 123' of the rotatable adapter 120' so as to surround the shaft 100 and an axial midpoint of the outer surface 113 of the rotatable seal member 110, respectively. FIG. 6 shows an exploded, axonometric view of a portion of each of these elements.

Screws 129' are used to fasten the portions 122' of the rotatable adaptor 120' together so as to assemble the rotatable seal member 110 and the rotatable adaptor 120' around the shaft 100. Once assembled, the inner surface 123' of the rotatable adaptor 120' is preferably spaced from the outer surface 105 of the rotatable shaft 100 by a distance no greater than about 0.005 inches to enable direct sealing therebetween.

To securely retain the rotatable seal member 110 within the chamber 121, both the inner surface of the chamber 121 and the outer surface 113 of the rotatable seal member 110 are tapered, e.g., at an angle of about 15° relative to the longitudinal axis of the rotatable shaft 100. As best seen in FIGS. 4 and 6, the sealing surface 114 has the largest radial dimension of the rotatable seal member 110 so as to be wider than the O-ring 127". A circumferential ridge 116 is provided at the axially remote end of the rotatable seal member 110 opposite the sealing surface 114 so as to have a larger diameter than the inner diameter of the O-ring 127" in its uncompressed state. The rotatable seal member 110 is thus retained in a self-aligning relationship so the outer circumferential surface 113 thereof is positioned against the inner surface 123' of the rotatable adapter 120'.

To hold the rotatable adaptor 120', and thus, the rotatable seal member 110, in a fixed position relative to the shaft 100, a plurality of resilient holding segments 130' are positioned between the inner diameter surface 123' of the rotatable adaptor 120' and the outer surface 105 of the rotatable shaft 100. As described above, compression of the holding segments 130' provides a resiliency-induced resistant force sufficient to prevent movement of the rotatable adaptor 120' in an axial direction and in a circumferential direction. In the exemplary embodiment of FIGS. 4 through 9, the holding segments 130' are sufficiently compressed to hold the rotatable adaptor 120' in place when the ends 124' of the portions 122' of the rotatable adaptor 120' are attached together.

A recess 126' is provided on the inner diameter surface 123' of the rotatable adaptor 120' for receiving the resilient holding segments 130', and each holding segment 130' extends beyond the recess 126' toward the rotatable shaft 100. The resiliency of the holding segments 130' is established in the manner described above such that the holding segments 130' continue to extend beyond the recess 126' when the holding segments 130' are compressed sufficiently to hold the rotatable adaptor 120' in place. Preferably, each holding segment 130' constitutes a spring member 131' as described in detail with regard to the embodiment shown in FIG. 3. That is, the spring member 131' has a continuous concave surface 132' directed toward the rotatable shaft 100 and opposite gripping edges 134' for holding the rotatable adaptor 120' in place. As further described above, each holding segment 130' extends less than 180° circumferentially around the rotatable shaft 100.

Although the actual dimensions and configuration of the holding segments 130' will depend upon the expected operating conditions, reference is made purely for purpose of explanation to a rotatable adaptor 120' that is fixed in place on a rotatable shaft 100 having an outside diameter of 3 in. Assuming that the maximum axial force to be experienced by the rotatable adaptor 120' is expected to be 300 lbs. and the maximum expected torque is 60 inch-lbs., a resistant force of 300 lbs. is required by the holding segments 130' to prevent movement of the rotatable adaptor 120' relative to the shaft 100. Further assuming that two holding segments 130' are used, and that the friction coefficient between each holding segment 130' and the shaft 100' is 0.15, a radially-directed linear force of 500 lbs. must be applied by each holding segment 130'.

Utilizing equations (1) and (2) above, the dimensions of each holding segment 130' may be calculated so as to establish the required resiliency. For example, two metal spring members 131' each having a length of 5 inches, a width of 0.6 inches, and a thickness of 0.040, could be used to satisfy this exemplary application. In this manner, the holding segments 130' would be capable of withstanding a compressive force of up to 300 lbs. and transferring a torque of up to 450 inch.lbs. without failure.

Alternatively, or in addition to the use of the rotatable adaptor 120', a plurality of holding segments 130' and an O-ring may be positioned between the inner diameter surface of the rotatable seal member 110 and the outer surface 105 of the rotatable shaft 100 to hold the rotatable seal member 110 in a fixed position on the rotatable shaft 100. If the rotatable adaptor 120' is not used, then screws or similar fasteners would be provided to join the ends of the portions 112 of the rotatable seal member 120 together for assembly around the shaft 100.

In addition to the rotatable adaptor 120' and the rotatable seal member 110, the exemplary pusher seal assembly of the present invention also includes a base member 140 mounted on the machinery housing, a non-rotatable seal member 150 positioned between the base member 140 and the rotatable shaft 100, and a biasing device to urge the non-rotatable seal member 150 axially along the rotatable shaft 100 toward the rotatable seal member 110. Each of these elements is described in greater detail below.

The base member 140 is mounted on a stationary structure, such as the machinery housing, in a conventional manner so as to surround the outer surface 105 of the rotatable shaft 100. The base member 140 is preferably split into two 180° portions 142 that are fastened to each other with screws 145. Packing 253 is provided to seal the base member 140 against a cap 250 through which the shaft 100 projects. One or more screws 255 extend axially to affix the cap 250 to the base member 140.

Figure 7:
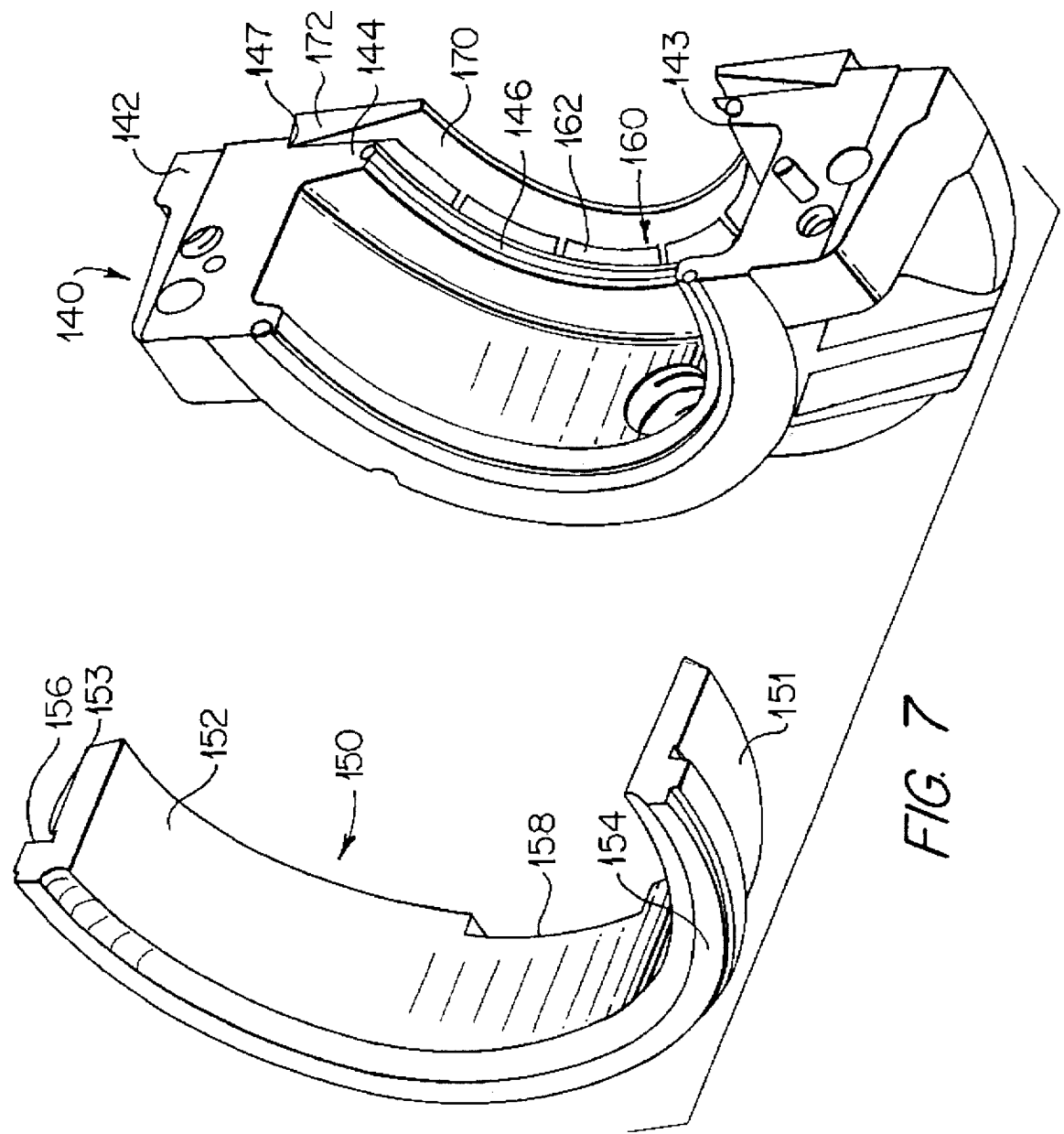
FIG. 7 is an exploded, axonometric view of a portion of the non-rotatable seal member and the base member.

As previously mentioned, and as shown in FIG. 4, the non-rotatable seal member 150 is generally positioned between the rotatable shaft 100 and the base member 140. FIGS. 4 and 7 further show that the base member 140 is provided with an inwardly-directed, radial flange 144 having a packing O-ring 146 on an inner diameter 143 thereof. The inner diameter 143 of the flange 144 defines a circular opening for receiving the split non-rotatable seal member 150. Preferably, the non-rotatable seal member 150 is split into two or more portions 152 so the packing O-ring 146 generally holds the portions 152 of the non-rotatable seal member 150 in radial compression.

The non-rotatable seal member 150 includes a cylindrical body 151, which is axially movable within the inner diameter 143 of the flange 144. A seal portion extending radially outwardly from the cylindrical body 151 has a sealing face 154 disposed for engagement with the rotatable seal member 110. At the intersection of the cylindrical body 151 and a surface 156 of the non-rotatable seal member 150 axially opposite the seal face 154, a circumferential notch 153 is formed. A deformable retaining ring 155, which is dimensioned to fit into the notch 153, is used to hold the separate portions 152 of the non-rotatable seal member 150 together. Once assembled around the rotatable shaft 100, the retaining ring 155 is snapped into the notch 153 in a conventional manner.

Figure 8:
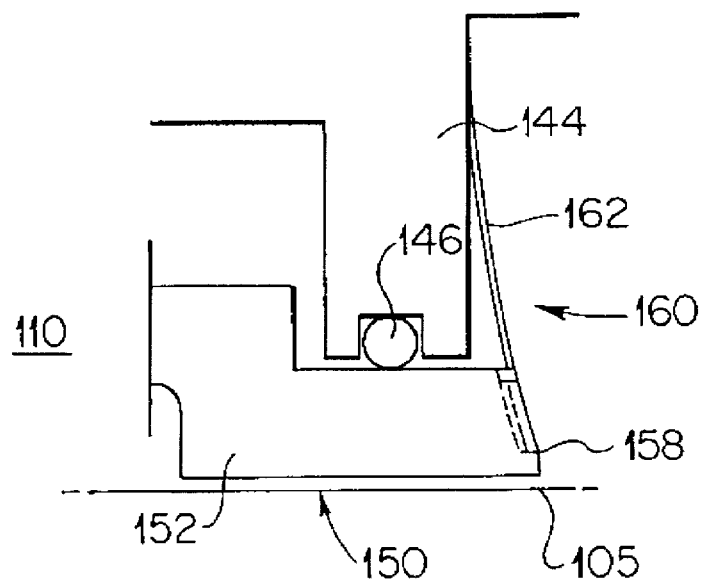
FIG. 8 is a partial cross-sectional view of a portion of the non-rotatable seal member assembled within the base member.
Figure 9:
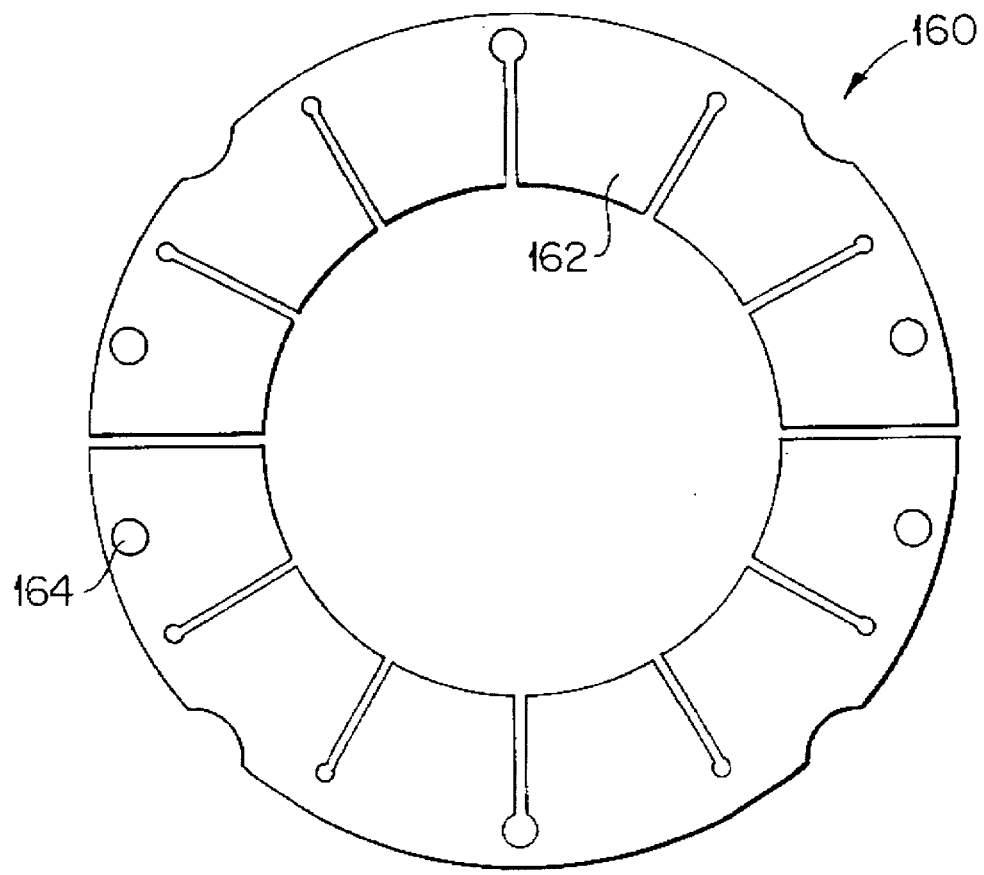
FIG. 9 is plan view of one form of a finger spring for retaining and biasing the non-rotatable seal member.

The biasing device of the exemplary embodiment is provided within an annular recess 147 in the base member 140 surrounding the cylindrical body 151 to urge the non-rotatable seal member 150 toward the rotatable seal member 110, as shown in FIG. 8. In the preferred embodiment of the pusher seal assembly, the biasing device includes a split annular finger spring 160, in the form of a diaphragm spring, having radially inwardly extending segments or fingers 162. FIG. 9 shows that the fingers 162 are preferably of equal dimensions and separated by radial grooves. The split annular finger spring 160 is illustrated in a plan view in FIG. 9. Additionally, holes 164 are provided in the finger spring 160 to receive fasteners for mounting.

The annular finger spring 160 is mounted in the annular recess 147 by an annular, split spring retainer ring 170 dimensioned to have an outer annular portion 172 for compressing the radially outer end of the finger spring 160 against the base member 140. The axially inner portion, i.e., the portion proximate the sealing face 154, of the spring retainer 170 defines the annular recess 147 into which the spring 160 may project and have room to flex toward and away from the rear surface of the base member 140 to permit axial movement of the non-rotatable seal member 150.

The portions 152 of the split non-rotatable seal member 150 are configured to receive the biasing device. For example, when a finger spring 160 is provided as in the preferred embodiment, notches 158 are formed in the cylindrical body 151 of the non-rotatable seal member 150 at the end axially remote from the sealing face 154 for receiving corresponding spring fingers 162. Each notch 158 preferably is dimensioned to receive one spring finger 162. In one exemplary embodiment, the notch 158 has an axial depth of ¼ inch. Other embodiments have been achieved in which a notch depth of 0.050 inches has been sufficient to receive a spring finger 162 to retain the non-rotatable seal member 150 against rotation.

For handling the split seal members 110 and 150, a tool 180 is provided for installation of the device and seal members. The tool 180 permits the separate portions of the rotatable seal member 110 or non-rotatable seal member 150 to be held together without relative motion during assembly.

Figure 10:
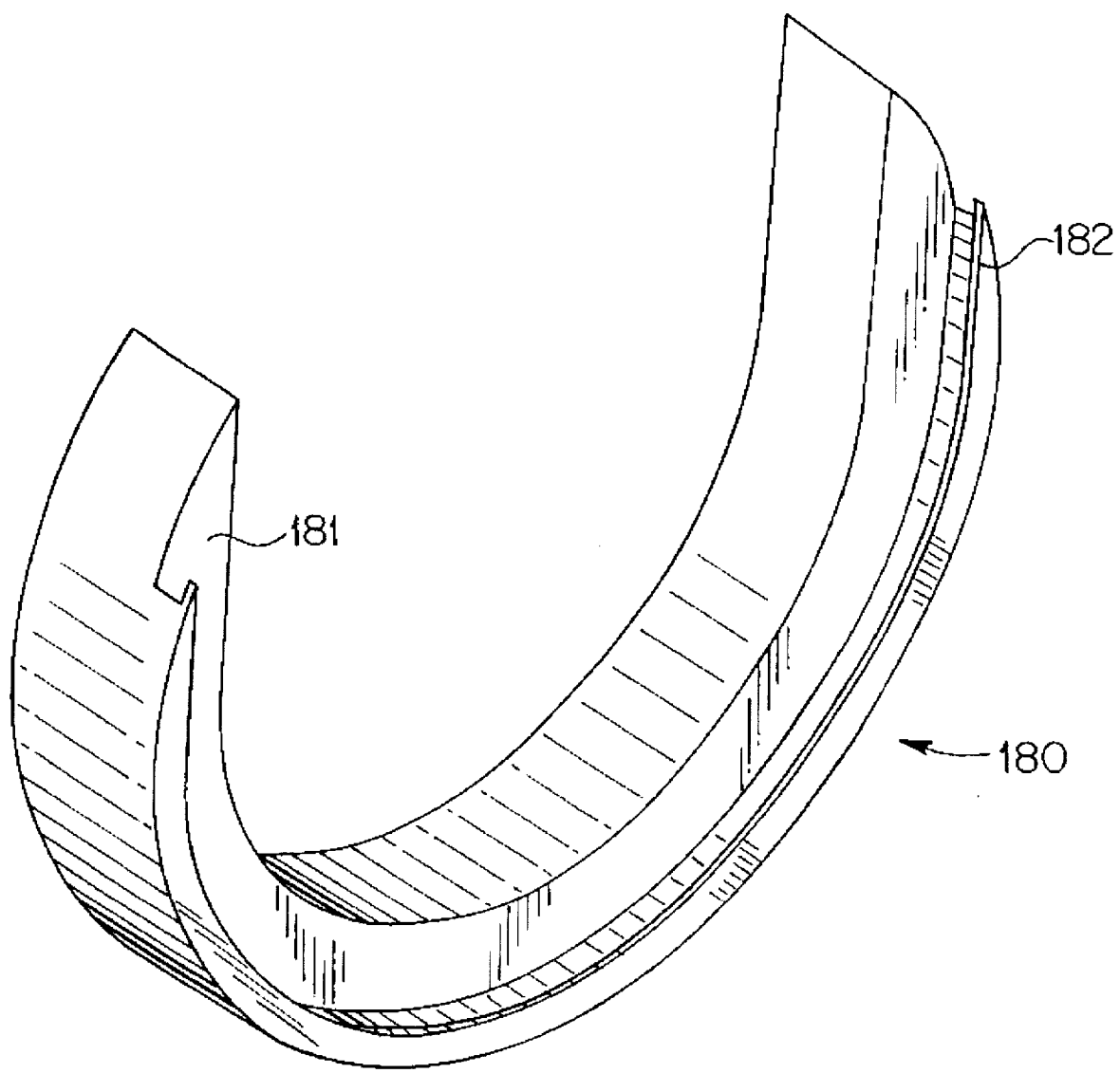
FIG. 10 is an axonometric view of an installation tool for use in accordance with the present invention.

The tool 180 generally comprises a substantially U-shaped symmetrical collar having an axially extending flange 182 of L-shaped cross section. The flange 182 is adapted to grasp the outer surface of the portions of either the rotatable seal member 110 or the non-rotatable seal member 150, as shown in the dotted lines in FIG. 10. The tool 180 is preferably deformable to receive an outer surface of either the rotatable seal member 110 or the non-rotatable seal member 150 and compress the portions together.

In one embodiment, the tool 180 has a surface 181 for bearing against the sealing surface 114 of the rotatable seal member 110. A circumferential flange 182 depends therefrom for grasping the outer surface 113 of the rotatable seal member 110. In use, the tool 180 is moved in a transverse direction, i.e., along a radial line, to surround and compress the portions 112 of the rotatable seal member 110 together while they are positioned around the outer surface 105 of the rotatable shaft 100. The rotatable adaptor 120' and holding segments 130' may then be positioned and assembled more readily to secure the rotatable seal member 110 in a fixed position on the rotatable shaft 100.

It will be apparent to those skilled in the art that various modifications and variations can be made in the configuration and fabrication of the device of the present invention, as well as the sequence and performance of the method of the present invention, without departing from the scope or spirit of the invention.

Other embodiments of the invention will be apparent to those skilled in the art from consideration of the specification and practice of the invention disclosed herein. Further, it is intended that the principles and examples set forth in the specification are considered as explanatory only, with the true scope and spirit of the invention being indicated by the following claims.

What is claimed is:

1. A split component to be held in a fixed position on an outer surface of a shaft, the split component comprising:

a component member including at least two portions having opposite ends, the ends of the portions mating together to assemble the component member peripherally around the outer surface of the shaft, the component member having an inner surface directed toward the outer surface of the shaft, the inner surface including at least one recess; and a plurality of resilient holding segments positioned in the at least one recess directly between the inner surface of the component member and the outer surface of the shaft so that compression of the holding segments provides a resiliency-induced resistant force sufficient to prevent movement of the component member in an axial direction along the shaft, each of the resilient holding segments including a spring member having a continuous surface facing toward the outer surface of the shaft, the continuous surface of the spring member having a concave shape in a plane parallel to a longitudinal axis of the shaft.

2. The split component of claim 1, wherein the holding segments are compressed sufficiently to hold the component member in place by mating the ends of the portions together to assemble the component member about the shaft.

3. The split component of claim 2, wherein the spring member includes edges extending beyond the at least one recess toward the shaft, the spring member having a resiliency sufficient to maintain extension of the edges beyond the recess to hold the component member in place on the outer surface of the shaft.

4. The split component of claim 3, wherein the inner surface of the component member is spaced from the outer surface of the shaft by a distance no greater than about 0.005 inches.

5. The split component of claim 1, wherein the shaft is circular in cross-section and the inner surface of the component member is cylindrical; and further wherein the resistant force provided by the holding segments is sufficient to prevent movement of the component member in a circumferential direction relative to the shaft.

6. The split component of claim 5, wherein each holding segment extends less than 180° circumferentially around the outer surface of the shaft.

7. The split component of claim 1, wherein the resistant force provided by the holding segments increases when movement of the component member relative to the shaft is attempted.

8. The split component of claim 1, wherein the spring member is arcuate in cross-section.

9. The split component of claim 1, wherein the spring member further has gripping edges directed toward the outer surface of the shaft along opposite sides of the continuous surface of the spring member.

10. The split component of claim 1, wherein the spring member is made of metal.

11. A pusher seal assembly for sealing an annular gap between a housing and an outer surface of a rotatable shaft, the assembly comprising:

a rotatable seal member mounted circumferentially around the outer surface of the rotatable shaft, the rotatable seal member having a sealing surface;

a rotatable adaptor mounted circumferentially around the outer surface of the rotatable shaft, the rotatable adaptor having an inner diameter surface and a chamber for receiving at least a portion of the rotatable seal member, the inner diameter surface including at least one recess;

a plurality of resilient holding segments positioned in the at least one recess directly between the inner diameter surface of the rotatable adaptor and the outer surface of the rotatable shaft so that compression of the holding segments provides a resiliency-induced resistant force sufficient to prevent movement of the rotatable adaptor relative to the rotatable shaft, each of the resilient holding segments including a spring member having a continuous surface facing toward the outer surface of the shaft, the continuous surface of the spring member having a concave shape in a plane parallel to a longitudinal axis of the shaft;

a base member mounted on the housing proximate the annular gap;

a non-rotatable seal member positioned between the base member and the rotatable shaft so as to encompass the outer surface of the rotatable shaft, the non-rotatable seal member having a seal face for sealing engagement with the sealing surface of the rotatable seal member; and a biasing device to urge the non-rotatable seal member axially along the rotatable shaft toward the rotatable seal member.

12. The pusher seal assembly of claim 11, wherein the spring member includes edges extending beyond the at least one recess toward the rotatable shaft, the spring member having a resiliency sufficient to maintain extension of the edges beyond the recess to hold the rotatable adaptor in place on the outer surface of the rotatable shaft.

13. The pusher seal assembly of claim 11, wherein the rotatable adaptor is split into at least two portions having opposite ends, and the holding segments are compressed sufficiently to hold the rotatable adaptor in place by mating the ends of the portions together to assemble the rotatable adaptor about the shaft.

14. The pusher seal assembly of claim 13, wherein the inner surface of the rotatable adaptor is spaced from the outer surface of the rotatable shaft by a distance no greater than about 0.005 inches.

15. The pusher seal assembly of claim 11, wherein each holding segment extends less than 180° circumferentially around the rotatable shaft.

16. The pusher seal assembly of claim 11, wherein the resistant force provided by the holding segments increases when movement of the rotatable adaptor relative to the shaft is attempted.

17. The pusher seal assembly of claim 11, wherein the spring member is arcuate in cross-section.

18. The pusher seal assembly of claim 11, wherein the spring member further has gripping edges directed toward the rotatable shaft along opposite sides of the continuous surface of the spring member.

19. A method for holding a component member in a fixed position on an outer surface of a shaft, the component member including at least two portions having opposite ends and an inner surface directed toward the outer surface of the shaft, the ends of the portions mating together to assemble the component member peripherally around the outer surface of the shaft, the method comprising the steps of:

providing at least one recess on the inner surface of the component member;

positioning a plurality of resilient holding segments in the at least one recess directly between the inner surface of the component member and the outer surface of the shaft so that compression of the holding segments provides a resiliency-induced resistant force sufficient to prevent movement of the component member in an axial direction along the shaft, each of the resilient holding segments including a spring member having a continuous surface facing toward the outer surface of the shaft, the continuous surface of the spring member having a concave shape in a plane parallel to a longitudinal axis of the shaft; and mating the ends of the portions together to assemble the component member about the shaft so the holding segments are sufficiently compressed to hold the component member in place on the outer surface of the shaft.

20. The method of claim 19, wherein the positioning step includes the substep of placing the spring member in the at least one recess so that edges of the spring member extend beyond the recess toward the shaft, the spring member having a resiliency sufficient to maintain extension of the edges beyond the recess to hold the component member in place on the outer surface of the rotatable shaft.

21. The method of claim 19, wherein the shaft is circular in cross-section and the component member has a cylindrical inner surface, and wherein the resistant force provided by the holding segments is sufficient to prevent movement of the component member in a circumferential direction relative to the shaft.

22. The method of claim 19, wherein each holding segment positioned between the inner surface of the component member and the outer surface of the shaft by the positioning step extends less than 180° circumferentially around the outer surface of the shaft.

23. The method of claim 19, wherein the spring member is arcuate in cross-section.

24. The method of claim 19, wherein each spring member further has gripping edges directed toward the outer surface of the shaft along opposite sides of the continuous surface of the spring member.

* * * * *